(12) United States Patent  
Tsuruda et al.

(10) Patent No.: US 12,406,350 B2  
(45) Date of Patent: *Sep. 2, 2025

(54) ESTIMATION MODEL CREATION DEVICE, ESTIMATION MODEL CREATION METHOD, AND STORAGE MEDIUM

(71) Applicant: Tokyo Electron Limited, Tokyo (JP)

(72) Inventors: Toyohisa Tsuruda, Koshi (JP); Masato Hosaka, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,953

(22) Filed: Jun. 17, 2024

(65) Prior Publication Data

US 2024/0338809 A1    Oct. 10, 2024

Related U.S. Application Data

(63) Continuation of application No. 17/645,127, filed on Dec. 20, 2021, now Pat. No. 12,051,189.

(30) Foreign Application Priority Data

Dec. 24, 2020    (JP) ................. 2020-215306

(51) Int. Cl.  
*G06K 9/00*    (2022.01)  
*G06T 7/00*    (2017.01)  
(Continued)

(52) U.S. Cl.  
CPC ............. *G06T 7/0004* (2013.01); *G06T 7/50* (2017.01); *G06T 7/90* (2017.01)

(58) Field of Classification Search  
CPC .......... G06T 7/0004; G06T 7/50; G06T 7/90; G06T 2207/30148; G06T 7/62;  
(Continued)

(56) References Cited

U.S. PATENT DOCUMENTS 12,051,189 B2 *   7/2024   Tsuruda ................ G06T 7/62  
2003/0130806 A1   7/2003   Mizuno et al.  
(Continued)

FOREIGN PATENT DOCUMENTS

JP    2015-215193 A    12/2015

*Primary Examiner* — Duy M Dang  
(74) *Attorney, Agent, or Firm* — Armstrong Teasdale LLP

(57) ABSTRACT

A device for creating a shape characteristic value estimation model for estimating a shape characteristic value includes: a post-processing-image acquisition part for acquiring a post-processing image of a surface of a substrate subjected to film processing; a pre-processing-image acquisition part for acquiring a pre-processing image of the surface not subjected to the film processing; a color-change estimation model creation part for creating a color-change estimation model for estimating first color-related information of the surface of the substrate included in the post-processing image from second color-related information of the surface of the substrate included in the pre-processing image; and a correlation estimation model creation part for creating a correlation estimation model by obtaining a difference between the first information and a result estimated by the color-change estimation model, the correlation estimation model being used for estimating correlation between the difference and the shape characteristic value.

17 Claims, 11 Drawing Sheets

(51) Int. Cl.
*G06T 7/50* (2017.01)
*G06T 7/90* (2017.01)

(58) Field of Classification Search
CPC . G06T 2207/10024; G06T 2207/10004; G06T 7/60; H01L 22/12; H01L 21/027; H01L 21/6715; G01B 11/2509; G01B 11/0616; G01N 2033/0095; G01N 21/9501; G01N 2223/6161; G01N 2021/95669
See application file for complete search history.

(56) References Cited

U.S. PATENT DOCUMENTS

| | | |
|---|---|---|
| 2005/0117796 A1 | 6/2005 | Matsui et al. |
| 2011/0109738 A1 | 5/2011 | Sakaguchi et al. |
| 2015/0324970 A1 | 11/2015 | Iwanaga et al. |
| 2019/0120775 A1 | 4/2019 | Sawlani et al. |

* cited by examiner

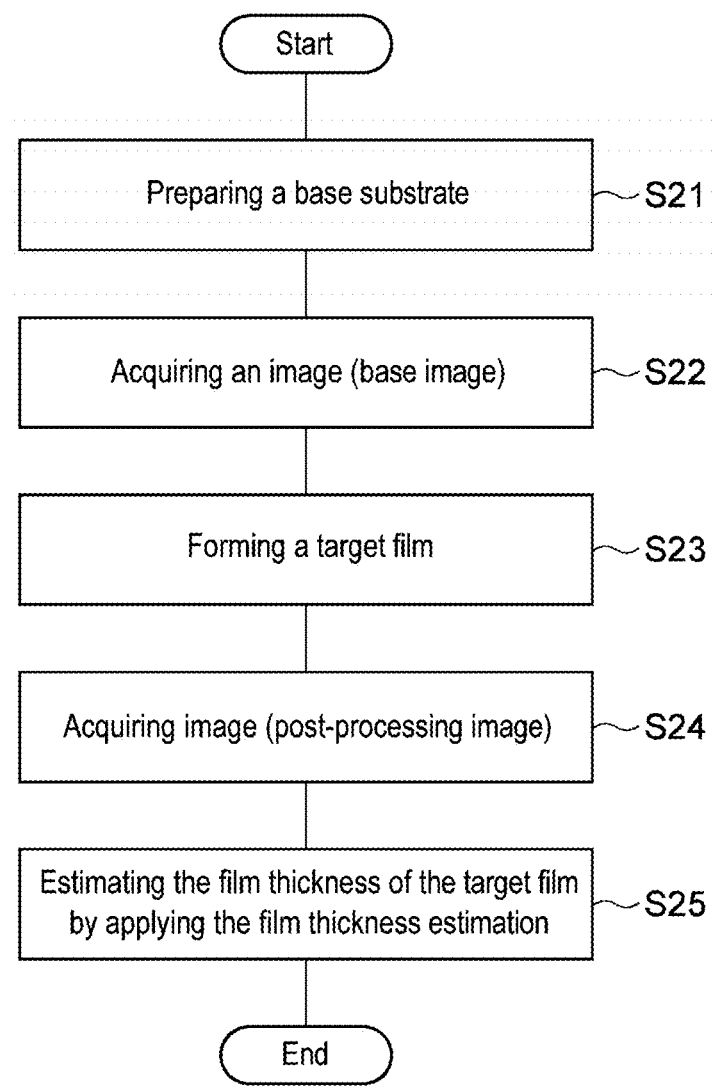

ESTIMATION MODEL CREATION DEVICE, ESTIMATION MODEL CREATION METHOD, AND STORAGE MEDIUM

CROSS-REFERENCE TO RELATED APPLICATION

The present application is a continuation of U.S. patent application Ser. No. 17/645,127, filed Dec. 20, 2021, which claims the benefit of priority from Japanese Patent Application No. 2020-215306, filed on Dec. 24, 2020, each of which is hereby incorporated herein by reference in its entirety.

TECHNICAL FIELD

The present disclosure relates to a shape characteristic value estimation model creation device, a shape characteristic value estimation model creation method, and a non-transitory computer-readable storage medium.

BACKGROUND

In the related art, there is known a configuration in which the film thickness of a film formed on a substrate is calculated from an image obtained by capturing the surface of the substrate. At this time, the correlation data is used in which the pixel value obtained from a preparatory captured image and the film thickness measurement value at each coordinate corresponding to the pixel value are associated with each other.

PRIOR ART DOCUMENT

Patent Document

Patent Document 1: Japanese Laid-Open Patent Publication No. 2015-215193

SUMMARY

According to one embodiment of the present disclosure, there is provided an estimation model creation device for creating a shape characteristic value estimation model for estimating a shape characteristic value related to a shape of a target film subjected to film processing on a substrate, including: a post-processing-image acquisition part configured to acquire a post-processing image, which is first image information on a surface of the substrate subjected to the film processing; a pre-processing-image acquisition part configured to acquire a pre-processing image, which is second image information on the surface of the substrate not subjected to the film processing; a color-change estimation model creation part configured to create a color-change estimation model for estimating first information on a color of the surface of the substrate included in the post-processing image from second information on a color of the surface of the substrate included in the pre-processing image; and a correlation estimation model creation part configured to create a correlation estimation model by obtaining a difference between the first information on the color of the surface of the substrate included in the post-processing image and a result estimated by the color-change estimation model, wherein the correlation estimation model is used for estimating a correlation between the difference and the shape characteristic value of the target film subjected to the film processing.

BRIEF DESCRIPTION OF DRAWINGS

The accompanying drawings, which are incorporated in and constitute a portion of the specification, illustrate embodiments of the present disclosure, and together with the general description given above and the detailed description of the embodiments given below, serve to explain the principles of the present disclosure.

FIG. 11 is a flowchart showing an example of a film thickness estimation method.

DETAILED DESCRIPTION

Figure 1:
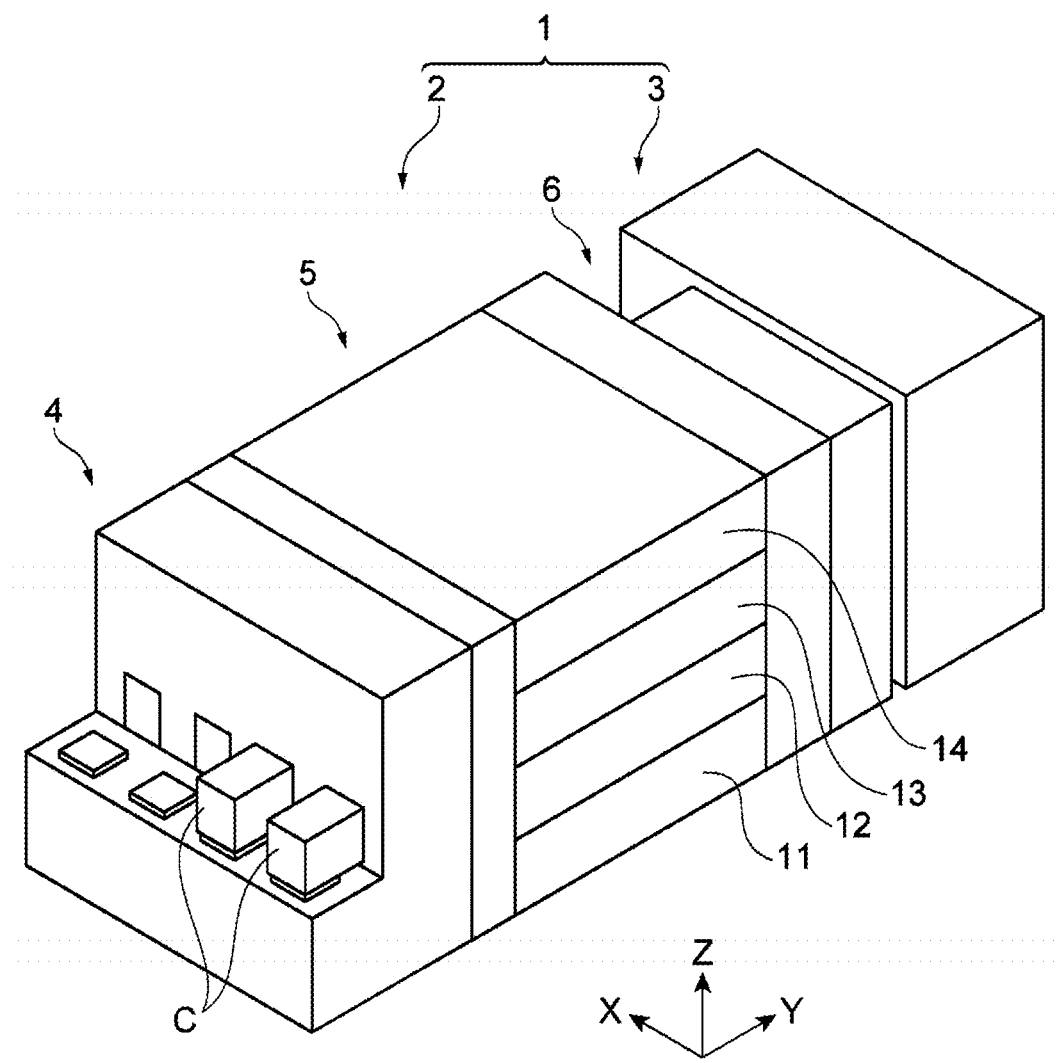
FIG. 1 is a schematic diagram showing an example of a schematic configuration of a substrate processing system.

Hereinafter, various exemplary embodiments will be described with reference to the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In one exemplary embodiment, there is provided an estimation model creation device for creating a shape characteristic value estimation model for estimating a shape characteristic value which is a characteristic value related to a shape of a target film subjected to film processing on a substrate, and the estimation model creation device includes: a post-processing-image acquisition part configured to acquire a post-processing image, which is first image information on a surface of the substrate on which the target film is formed; a pre-processing-image acquisition part configured to acquire a pre-processing image, which is second image information on the surface of the substrate on which the target film is not formed; a color-change estimation model creation part configured to create a color-change estimation model for estimating first information on a color of the surface of the substrate included in the post-processing image from second information on a color of the surface of the substrate included in the pre-processing image; and a correlation estimation model creation part configured to create a correlation estimation model for obtaining a difference between the first information on the color of the surface of the substrate included in the post-processing image and a result estimated by the color-change estimation model and estimating a correlation between the difference and the shape characteristic value of the target film subjected to the film processing.

According to the above estimation model creation device, the color-change estimation model for estimating the first information on the color of the surface of the substrate included in the post-processing image from the second information on the color of the surface of the substrate included in the pre-processing image is created. Then, the correlation estimation model for obtaining the difference between the first information on the color of the surface of the substrate included in the post-processing image and the result estimated by the color-change estimation model and estimating the correlation between the difference and the shape characteristic value of the target film subjected to the film processing is created. The color-change estimation model is a model that estimates the color of the surface of the substrate included in the post-processing image from the second information on the color of the surface of the substrate included in the pre-processing image, and is a model that estimates a variation of the color of the surface of the substrate included in the post-processing image due to the variation of the color of the surface of the substrate included in the pre-processing image. Meanwhile, the difference between the first information on the color of the surface of the substrate included in the post-processing image and the result estimated by the color-change estimation model is a factor that may vary depending on the shape of the target film. Therefore, by creating the correlation estimation model that estimates the correlation between the difference and the shape characteristic value of the target film subjected to the film processing, the shape characteristic value of the target film can be estimated from the difference. By creating such a model, it is possible to more easily create a model capable of accurately estimating the shape characteristic value related to the target film.

In an aspect, the correlation estimation model creation part may be configured to create the correlation estimation model by using a shape characteristic value of the target film acquired without using the shape characteristic value estimation model as the shape characteristic value of the target film subjected to the film processing.

As described above, the correlation estimation model is created by using the shape characteristic value of the target film acquired without using the shape characteristic value estimation model as the shape characteristic value of the target film subjected to the film processing. As a result, the correlation estimation model can be created using the shape characteristic value obtained independently of the shape characteristic value estimation model. Therefore, it is possible to accurately estimate the shape characteristic value related to the target film.

In an aspect, the correlation estimation model creation part may be configured to create the correlation estimation model upon acquiring information specifying the shape characteristic value of the target film subjected to the film processing.

As described above, by adopting the configuration in which the correlation estimation model is created upon acquiring the information specifying the shape characteristic value of the target film subjected to the film processing, for example, the color-change estimation model can be created by using a large number of images acquired in the past. If the creation of the color-change estimation model and the creation of the correlation estimation model can be performed independently in this way, the information suitable for the creation of each model can be effectively used, and the model capable of performing estimation with higher accuracy can be created.

In an aspect, the color-change estimation model creation part may be configured to create the color-change estimation model for the estimation model creation device by modifying a model created by a device different from the estimation model creation device.

In an aspect, the correlation estimation model creation part may be configured to create the correlation estimation model for the estimation model creation device by modifying a model created by a device different from the estimation model creation device.

As described above, one of the color-change estimation model creation part and the correlation estimation model creation part can create the model for the estimation model creation device by modifying the model created by the device different from the estimation model creation device. In this case, for example, since the shape characteristic value estimation model can be created by using the model created by another device, the model once created can be expanded to other devices and can be effectively used.

The film processing may be film formation processing for forming the target film on the substrate. By applying the above method to the film formation processing, it is possible to more easily create a model capable of accurately estimating a shape characteristic value related to the shape of the formed target film.

In one exemplary embodiment, there is provided an estimation model creation method of creating a shape characteristic value estimation model for estimating a shape characteristic value which is a characteristic value related to a shape of a target film subjected to film processing on a substrate, the method including: acquiring a post-processing image, which is first image information on a surface of the substrate subjected to the film processing; acquiring a pre-processing image, which is second image information on the surface of the substrate not subjected to the film processing; creating a color-change estimation model for estimating first information on a color of the surface of the substrate included in the post-processing image from second information on a color of the surface of the substrate included in the pre-processing image; and creating a correlation estimation model for obtaining a difference between the first information on the color of the surface of the substrate included in the post-processing image and a result estimated by the color-change estimation model and estimating a correlation between the difference and the shape characteristic value of the target film subjected to the film processing.

According to the above estimation model creation method, the color-change estimation model for estimating the first information on the color of the surface of the substrate included in the post-processing image from the second information on the color of the surface of the substrate included in the pre-processing image is created. Then, the correlation estimation model for obtaining the difference between the first information on the color of the surface of the substrate included in the post-processing image and the result estimated by the color-change estimation model and estimating the correlation between the difference and the shape characteristic value of the target film subjected to the film processing on the substrate is created. The color-change estimation model is a model that estimates the color of the surface of the substrate included in the post-processing image from the second information on the color of the surface of the substrate included in the pre-processing image, and is a model that estimates a variation of the color of the surface of the substrate included in the post-processing image due to the variation of the color of the surface of the substrate included in the pre-processing image. Meanwhile, the difference between the first information on the color of the surface of the substrate included in the post-processing image and the result estimated by the color-change estimation model is a factor that may vary depending on the shape of the target film. Therefore, by creating the correlation estimation model that estimates the correlation between the difference and the shape characteristic value of the target film subjected to the film processing, the shape characteristic value of the target film can be estimated from the difference. By creating such a model, it is possible to more easily create a model capable of accurately estimating the shape characteristic value related to the target film.

In one exemplary embodiment, the storage medium is a non-transitory computer-readable storage medium that stores a program for causing a device to perform the estimation model creation method described above.

Hereinafter, various exemplary embodiments will be described in detail with reference to the drawings. In addition, the same reference numerals are given to the same or corresponding parts in each drawing.

Substrate Processing System

The substrate processing system 1 is a system that performs formation of a photosensitive film, exposure of the photosensitive film and development of the photosensitive film on a workpiece W. The workpiece W to be processed is, for example, a substrate or a substrate on which a film, a circuit or the like is formed by performing a predetermined process. The substrate included in the workpiece W is, for example, a wafer containing silicon. The workpiece W (substrate) may be formed in a circular shape. The workpiece W to be processed may be a glass substrate, a mask substrate, an FPD (Flat Panel Display) or the like, or may be an intermediate obtained by subjecting these substrates or the like to a predetermined process. The photosensitive film is, for example, a resist film.

The substrate processing system 1 includes a coating/developing apparatus 2 and an exposure apparatus 3. The exposure apparatus 3 performs an exposure process for a resist film (photosensitive film) formed on the workpiece W (substrate). Specifically, the exposure apparatus 3 irradiates the exposed portion of the resist film with energy rays by a method such as immersion exposure or the like. The coating/developing apparatus 2 performs a process of forming a resist film on the surface of the workpiece W before the exposure process performed by the exposure apparatus 3, and performs a process of developing the resist film after the exposure process.

Substrate Processing Apparatus

Figure 2:
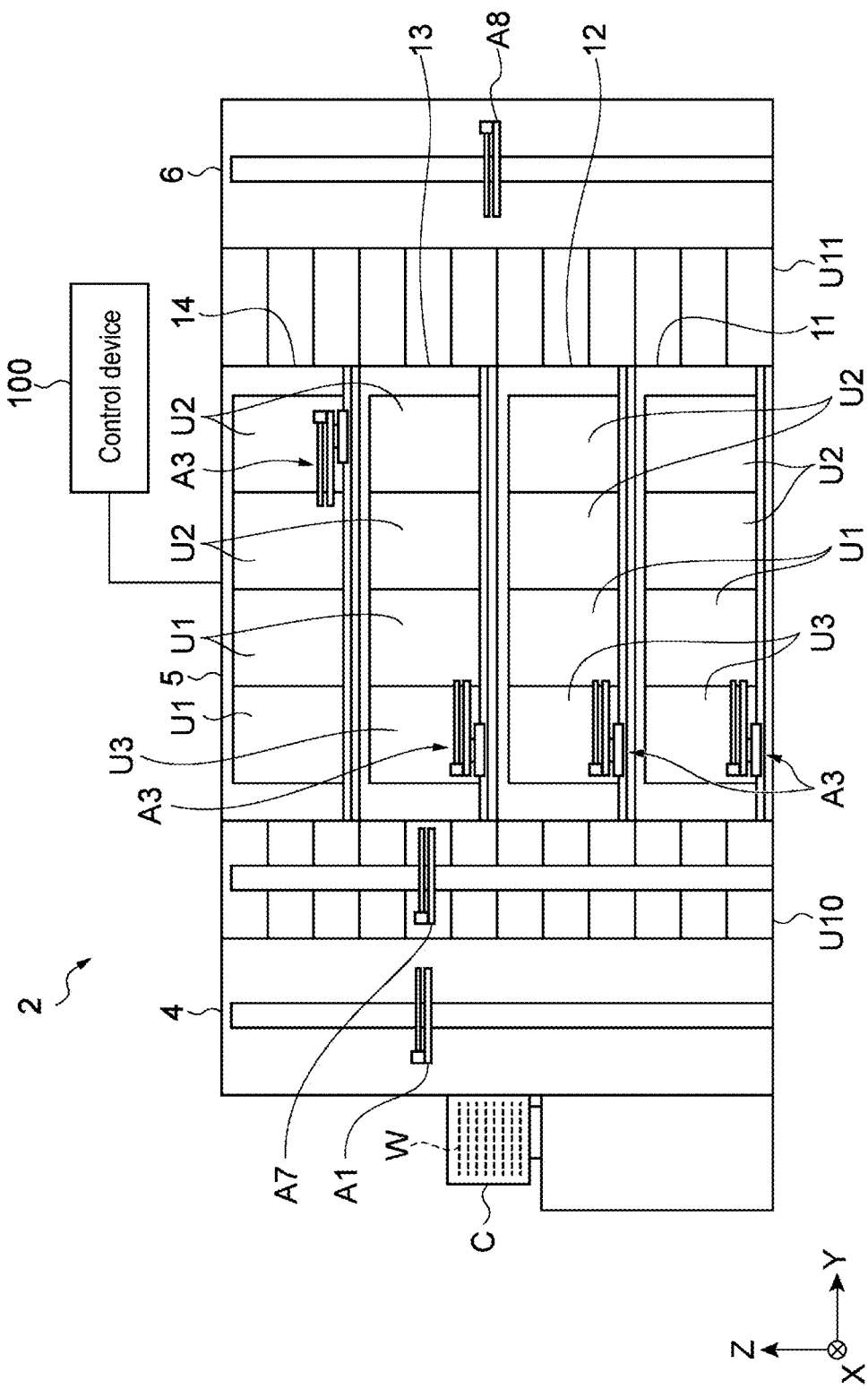
FIG. 2 is a schematic diagram showing an example of a coating/developing apparatus.

Hereinafter, a configuration of the coating/developing apparatus 2 will be described as an example of the substrate processing apparatus. As shown in FIGS. 1 and 2, the coating/developing apparatus 2 includes a carrier block 4, a processing block 5, an interface block 6, and a control device 100 (control part). The coating/developing apparatus 2 as the substrate processing apparatus described in the present embodiment corresponds to a shape characteristic value estimation device for estimating a shape characteristic value related to the shape of a target film formed on a substrate, and an estimation model creation device used for estimation of the shape characteristic value. The "shape characteristic value" related to the shape of the target film in the present embodiment corresponds to the characteristic quantity related to the shape of the target film. As an example, the shape characteristic value may include the film thickness and line width (CD: Critical Dimensions) of the target film. In the embodiment described below, a case in which the coating/developing apparatus 2 is used as a shape characteristic value estimation device to estimate the film thickness of the target film will be described. The film thickness estimation function of the coating/developing apparatus 2 will be described later.

The carrier block 4 loads the workpiece W into the coating/developing apparatus 2 and unloads the workpiece W from the coating/developing apparatus 2. For example, the carrier block 4 can support a plurality of carriers C (accommodation parts) for the workpiece W, and incorporates a transfer device A1 including a transfer arm. The carrier C accommodates, for example, a plurality of circular workpieces W. The transfer device A1 takes out the workpiece W from the carrier C to deliver the same to the processing block 5, and receives the workpiece W from the processing block 5 to return the same to the carrier C. The processing block 5 includes a plurality of processing modules 11, 12, 13 and 14.

The processing module 11 incorporates a plurality of coating units U1, a plurality of heat treatment units U2, a plurality of inspection units U3, and a transfer device A3 for transferring the workpiece W to these units. The processing module 11 forms an underlayer film on the surface of the workpiece W by the coating unit U1 and the heat treatment unit U2. The coating unit U1 of the processing module 11 coats the processing liquid for formation of an underlayer film on the workpiece W, for example, while rotating the workpiece W at a predetermined rotation speed. The heat treatment unit U2 of the processing module 11 performs various heat treatments involved in the formation of the underlayer film. The heat treatment unit U2 incorporates, for example, a heating plate and a cooling plate, and performs a heat treatment by heating the workpiece W to a predetermined heating temperature by the heating plate and cooling the heated workpiece W by the cooling plate. The inspection unit U3 performs a process for inspecting the state of the surface of the workpiece W, and acquires, for example, a surface image or information on a shape characteristic value (film thickness) as information indicating the state of the surface of the workpiece W.

The processing module 12 incorporates a plurality of coating units U1, a plurality of heat treatment units U2, a plurality of inspection units U3, and a transfer device A3 for transferring the workpiece W to these units. The processing module 12 forms an intermediate film on the underlayer film by the coating unit U1 and the heat treatment unit U2. The coating unit U1 of the treatment module 12 forms a coating film on the surface of the workpiece W by coating the processing liquid for forming an intermediate film on the underlayer film. The heat treatment unit U2 of the processing module 12 performs various heat treatments involved in the formation of the intermediate film. The heat treatment unit U2 incorporates, for example, a heating plate and a cooling plate, and performs a heat treatment by heating the workpiece W to a predetermined heating temperature by the heating plate and cooling the heated workpiece W by the cooling plate. The inspection unit U3 performs a process for inspecting the state of the surface of the workpiece W, and acquires, for example, a surface image or information on a shape characteristic value (film thickness) as information indicating the state of the surface of the workpiece W.

The processing module 13 incorporates a plurality of coating units U1, a plurality of heat treatment units U2, a plurality of inspection units U3, and a transfer device A3 for transferring the workpiece W to these units. The processing module 13 forms a resist film on the intermediate film by the coating unit U1 and the heat treatment unit U2. The coating unit U1 of the processing module 13 coats a processing liquid for formation of the resist film on the intermediate film, for example, while rotating the workpiece W at a predetermined rotation speed. The heat treatment unit U2 of the processing module 13 performs various heat treatments involved in the formation of the resist film. The heat treatment unit U2 of the processing module 13 forms a resist film by subjecting the workpiece W, on which the coating film is formed, to a heat treatment (PAB: Post Applied Bake) at a predetermined heating temperature. The inspection unit U3 performs a process for inspecting the state of the surface of the workpiece W, and acquires, for example, information on a shape characteristic value (film thickness) as information indicating the state of the surface of the workpiece W.

The processing module 14 incorporates a plurality of coating units U1, a plurality of heat treatment units U2, and a transfer device A3 for transferring the workpiece W to these units. The processing module 14 develops the exposed resist film R by the coating unit U1 and the heat treatment unit U2. The coating unit U1 of the processing module 14 coats a developing liquid on the surface of the exposed workpiece W, for example, while rotating the workpiece W at a predetermined rotation speed, and then rinses the developing liquid with a rinsing liquid to thereby perform a developing process for the resist film R. The heat treatment unit U2 of the processing module 14 performs various heat treatments involved in the developing process. Specific examples of the heat treatment may include a heat treatment before the developing process (PEB: Post Exposure Bake), a heat treatment after the developing process (PB: Post Bake), and the like.

A shelf unit U10 is provided on the carrier block 4 side in the processing block 5. The shelf unit U10 is divided into a plurality of cells arranged in the vertical direction. A transfer device A7 including an elevating arm is provided in the vicinity of the shelf unit U10. The transfer device A7 raises and lowers the workpiece W between the cells of the shelf unit U10.

A shelf unit U11 is provided on the interface block 6 side in the processing block 5. The shelf unit U11 is divided into a plurality of cells arranged in the vertical direction.

The interface block 6 transfers the workpiece W to and from the exposure apparatus 3. For example, the interface block 6 is provided with a built-in transfer device A8 including a transfer arm, and is connected to the exposure apparatus 3. The transfer device A8 delivers the workpiece W arranged in the shelf unit U11 to the exposure apparatus 3, and receives the workpiece W from the exposure apparatus 3 to return the workpiece W to the shelf unit U11.

Inspection Unit

The inspection unit U3 included in the processing modules 11 to 13 will be described. The inspection unit U3 has a function of obtaining image data by capturing the surface of a film (e.g., an underlayer film, an intermediate film, a resist film, etc.) formed by the coating unit U1 and the heat treatment unit U2.

Figure 3:
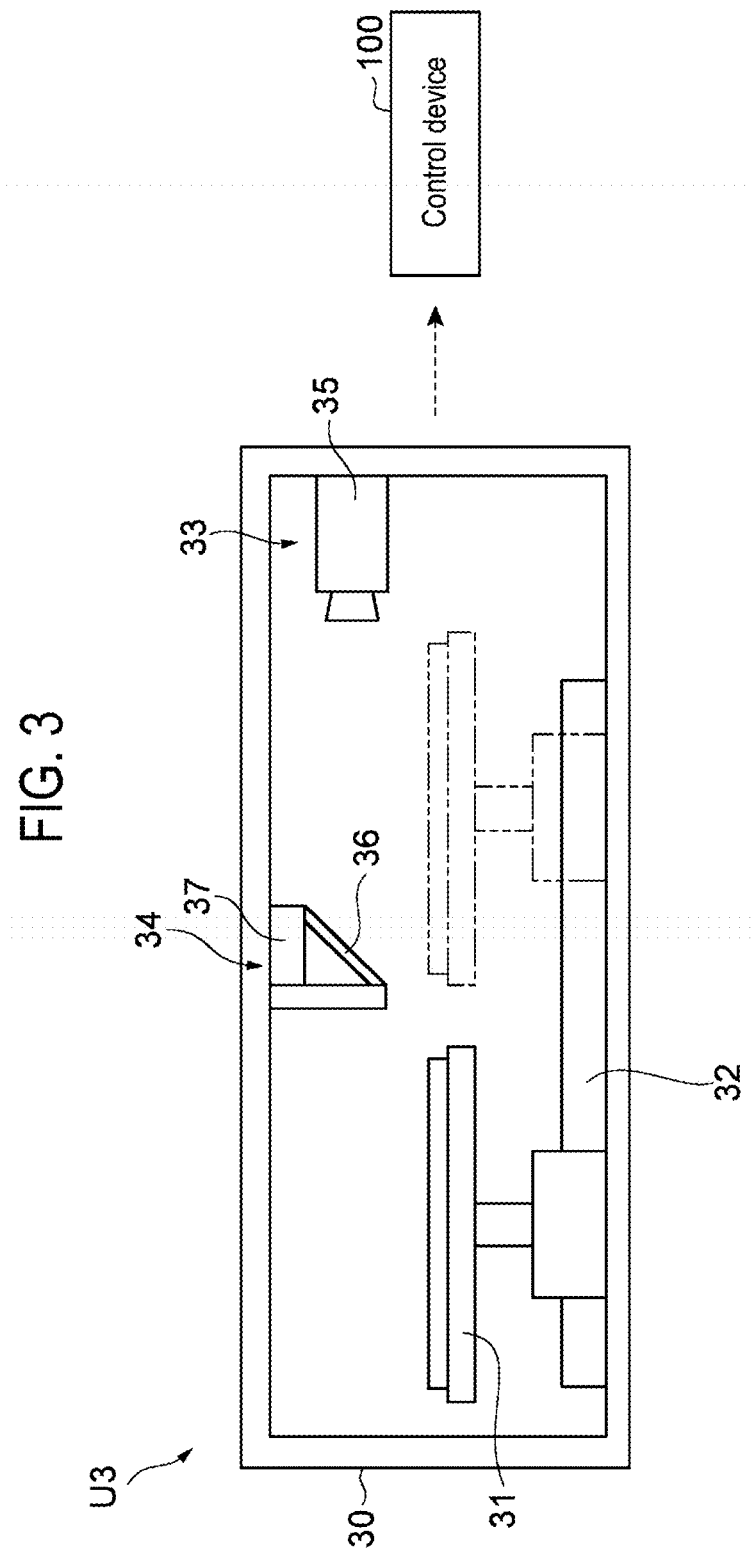
FIG. 3 is a schematic diagram showing an example of an inspection unit.

As shown in FIG. 3, the inspection unit U3 includes a housing 30, a holder 31, a linear driver 32, a capturing part 33, and a light emitting/reflecting part 34. The holder 31 holds the workpiece W horizontally. The linear driver 32 uses an electric motor or the like as a power source to move the holder 31 along a horizontal linear path. The capturing part 33 includes a camera 35 such as a CCD camera or the like. The camera 35 is installed on one end side in the inspection unit U3 in the moving direction of the holder 31, and is directed to the other end side in the moving direction. The light emitting/reflecting part 34 emits light into a capturing range and guides the reflected light from the capturing range toward the camera 35. For example, the light emitting/reflecting part 34 includes a half mirror 36 and a light source 37. The half mirror 36 is provided at a position higher than the holder 31 in the intermediate portion of the moving range of the linear driver 32 to reflect light from below toward the camera 35. The light source 37 is provided above the half mirror 36 to irradiate illumination light downward through the half mirror 36.

The inspection unit U3 is operated as follows to acquire image data about the surface of the workpiece W. First, the linear driver 32 moves the holder 31. As a result, the workpiece W passes under the half mirror 36. In this passing process, the reflected light from each portion of the surface of the workpiece W sequentially travels to the camera 35. The camera 35 focuses an image using the reflected light from each portion of the surface of the workpiece W and acquires image data about the surface of the workpiece W. When the shape (e.g., the film thickness, the line width, etc.) of the film formed on the surface of the workpiece W is changed, the image data on the surface of the workpiece W obtained by the camera 35, for example, the color of the surface of the workpiece W, is changed according to the change in the shape. That is, the act of acquiring the image data of the surface of the workpiece W corresponds to the act of acquiring the information on the shape of the film formed on the surface of the workpiece W. This point will be described later.

The image data acquired by the camera 35 is sent to the control device 100. The control device 100 can estimate a shape characteristic value of the film on the surface of the workpiece W based on the image data. The estimation result is held as an inspection result in the control device 100. The image data is also held in the control device 100.

Control Device

An example of the control device 100 will be described in detail. The control device 100 controls each element included in the coating/developing apparatus 2. The control device 100 is configured to execute a process including an act of forming each of the above-mentioned films on the surface of the workpiece W and an act of performing a developing process. Further, the control device 100 as a main part of the shape characteristic value estimation device is configured to execute a process of estimating a shape characteristic value of the formed film. A configuration example of the control device 100 in the case of estimating the film thickness of the target film as the shape characteristic value in the coating/developing apparatus 2 will now be described.

Figure 4:
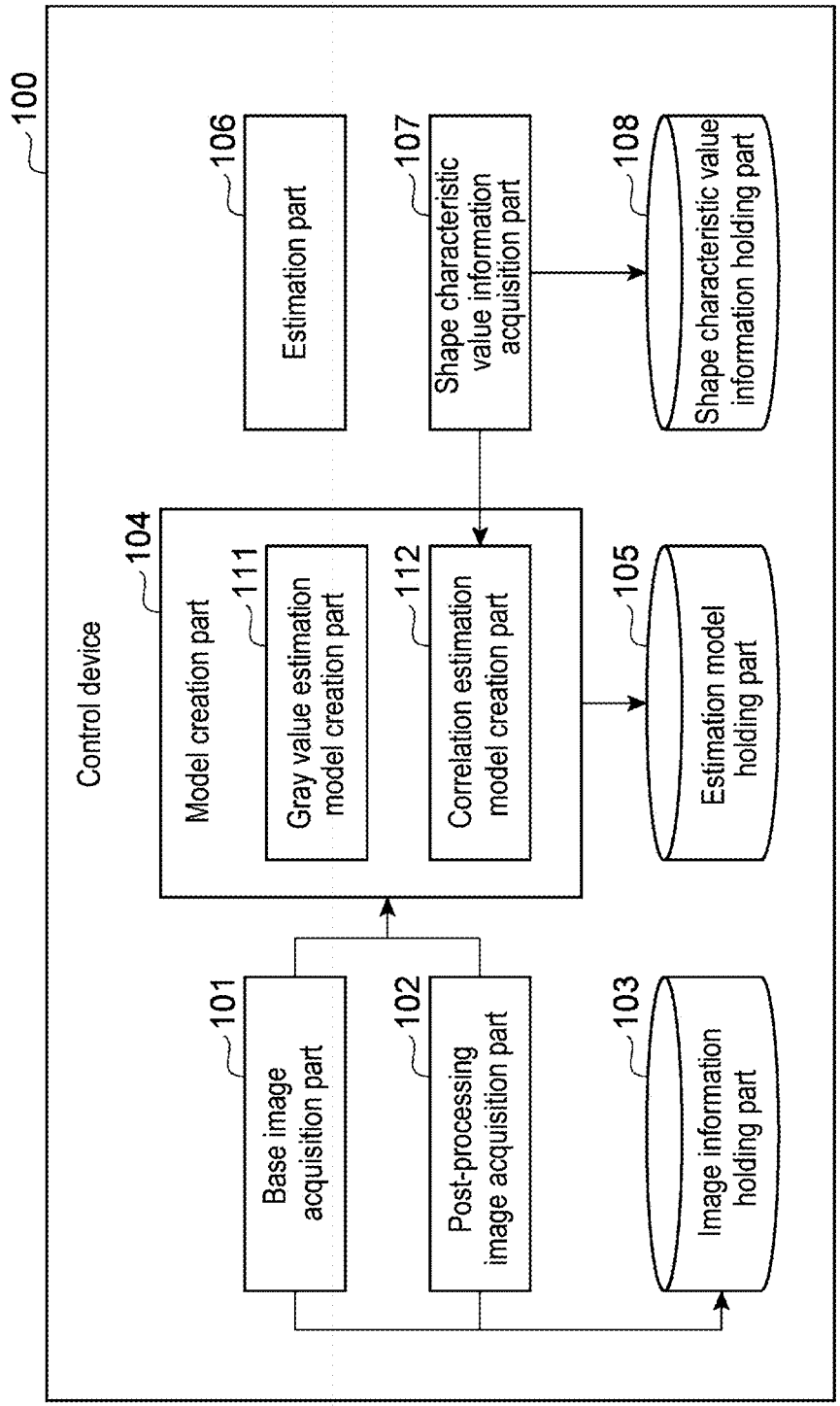
FIG. 4 is a block diagram showing an example of a functional configuration of a control device.

As shown in FIG. 4, the control device 100 includes a base image acquisition part 101 (pre-processing-image acquisition part), a post-processing-image acquisition part 102, an image information holding part 103, a model creation part 104, an estimation model holding part 105, an estimation part 106, a shape characteristic value information acquisition part 107, and a shape characteristic value information holding part 108. Each part of the control device 100 is shown as an example of the functional configuration. The model creation part 104 includes a gray value estimation model creation part 111 and a correlation estimation model creation part 112. Each functional part shown in FIG. 4 is a functional part for implementing a function as a film thickness estimation device, which is a kind of shape characteristic value estimation device. Further, each functional part shown in FIG. 4 also includes a functional part for implementing a function as a film thickness estimation model creation device, which is a kind of shape characteristic value estimation model creation device.

Before the explanation of each functional part, the outline of the process (inspection) performed by the coating/developing apparatus 2 including the control device 100 as a device for inspecting the substrate will be described. The coating/developing apparatus 2 performs a process of estimating the film thickness of the film formed on the surface of the workpiece W from the image obtained by capturing the surface of the workpiece W. When a film is formed on the surface of the workpiece W, the color of the surface of the workpiece W is changed depending on the thickness of the film. Utilizing this fact, the coating/developing apparatus 2 estimates the film thickness at each point on the surface of the workpiece W from the image data including the information on the color of the surface of the workpiece W.

The general procedure for estimating the film thickness is as follows. That is, first, a plurality of workpieces having a known film thickness of the film (target film) to be estimated is prepared. Then, a model related to the correlation between the information on the color of each pixel in the image information obtained by capturing the surface of each of these workpieces and the film thickness of the film on the surface of the workpiece at the capturing position at which each pixel is captured is created. Thereafter, an image of the surface of the workpiece on which the target film to be subjected to film thickness estimation is formed is acquired, and the film thickness of the film on the surface of the workpiece is estimated based on the information on the color of each pixel included in the image data and the model related to the correlation. This makes it possible to estimate the film thickness of the target film on the surface of the workpiece.

Figure 5:
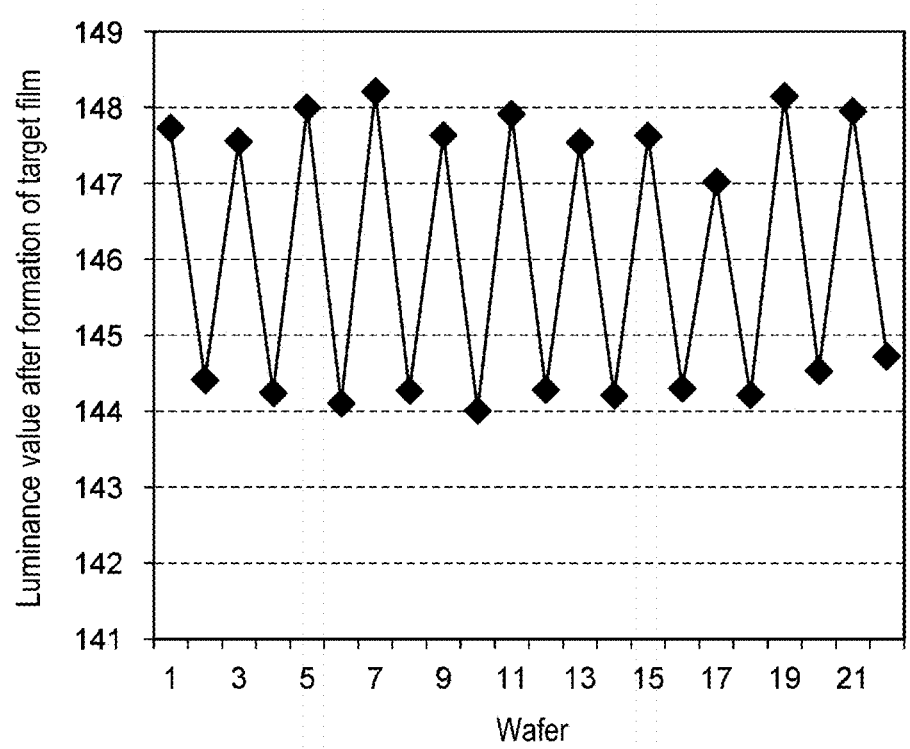
FIG. 5 is a diagram schematically showing a change in color-related information acquired from image data obtained by capturing a plurality of wafers.

FIG. 5 schematically shows a change in the information on the color acquired from image data obtained by capturing a plurality of workpieces. FIG. 5 shows information (here, a gray value) on the color of the surface acquired from the image data obtained by capturing the surface of the workpiece after the target film is formed. As shown in FIG. 5, different colors are shown for each work. Therefore, the film thickness of the film on the surface of the workpiece can be estimated by utilizing the difference in color.

However, in the above method, it may be impossible to create a model that considers the situation of the underlayer of the film to be subjected to film thickness estimation. As described above, a plurality of films is formed on the workpiece. Therefore, when the target film to be subjected to film thickness estimation is a resist film, an underlayer film and an intermediate film may be stacked under the resist film. Therefore, there is a possibility that the difference in the color of the surface of the workpiece for each workpiece as shown in FIG. 5 may not reflect the color change due to the film thickness of the film to be subjected to film thickness estimation but may reflect the variation in the state of the base portion below the film. When the film thickness of the film formed on the surface is sufficiently thin as in the substrate targeted in the present embodiment, it is fully conceivable that the variation in the state of the base portion is reflected in the variation in the color change on the surface of the workpiece.

The above-described film thickness estimation model estimates the correlation between the film thickness of the resist film and the color information in the image data. However, it can be said that no consideration is given to a case in which the film thickness of each film under the resist film is different. For example, if the film thickness of the intermediate film under the resist film is changed, the color of the surface of the workpiece may be changed depending on the film thickness of the intermediate film even before the resist film is applied. However, the film thickness estimation model may not sufficiently reflect the influence of such a lower film. In consideration of the above problems, it may be considered to create a film thickness estimation model using a workpiece in which the situation (film thickness, etc.) of the lower film is changed. However, it may be difficult to prepare a considerable number of workpieces corresponding to various conditions necessary for creating a model with high estimation accuracy.

Therefore, in the coating/developing apparatus 2 described in the present embodiment, a color-change estimation model is created as a model for estimating how the color of the surface of the workpiece W after forming the target film is changed from the image information (base image: pre-processing image) obtained by capturing the surface of the workpiece W in the base portion under the target film. In this regard, a gray value estimation model for estimating a change in a gray value is created. Then, under the assumption that a difference between an actually measured gray value and an estimated gray value obtained by applying a gray value estimation model to a base image correlates with the film thickness, a correlation estimation model that shows a correlation between the above difference and the film thickness is created. In the coating/developing apparatus 2 described in the present embodiment, a more accurate film thickness estimation result is calculated by estimating the film thickness by using the two models as film thickness estimation models for estimating the film thickness. Details of these two models will be described later.

The base image acquisition part 101 of the control device 100 shown in FIG. 4 has a function of acquiring image information (also referred to as a base image: pre-processing image) of the surface of the workpiece on which a film thickness estimation target film is not formed. The base image acquisition part 101 acquires a base image of a target workpiece W by, for example, controlling the inspection unit U3.

The post-processing-image acquisition part 102 has a function of acquiring image information (post-processing image) of the surface of the workpiece W after forming the target film. The post-processing-image acquisition part 102 acquires the post-processing image of the workpiece W as a target by, for example, controlling the inspection unit U3.

The image information holding part 103 has a function of holding the base image acquired by the base image acquisition part 101 and the post-processing image acquired by the post-processing-image acquisition part 102. The image information held by the image information holding part 103 is used for estimating the film thickness of the target film formed on the workpiece W.

The model creation part 104 has a function of creating a film thickness estimation model used for estimating the film thickness of the target film formed on the workpiece W. As will be described in detail later, the film thickness estimation model M created by the model creation part 104 includes a gray value estimation model M1 and a correlation estimation model M2. The gray value estimation model creation part 111 of the model creation part 104 has a function of creating the gray value estimation model M1, and the correlation estimation model creation part 112 has a function of creating the correlation estimation model M2.

The estimation model holding part 105 has a function of holding the film thickness estimation model created by the model creation part 104.

The estimation part 106 has a function of estimating the film thickness of the target film based on the base image and the post-processing image held by the image information holding part 103. The film thickness estimation model is used for estimating the film thickness by the estimation part 106.

The shape characteristic value information acquisition part 107 has a function of acquiring information on the film thickness of the target film (also referred to as a film thickness value: film thickness information), which corresponds to the shape characteristic value related to the target film acquired without using the film thickness estimation model. The film thickness value of the target film acquired without using the film thickness estimation model may be, for example, a measurement value of the film thickness of the target film measured by any method. Further, in a situation where the operation of the coating/developing apparatus 2 is stable, for example, evaluation is performed by forming a film on an inspection substrate during a detailed inspection (QC inspection) related to the operation confirmation of the apparatus. Therefore, the inspection result at this time may be used as the film thickness value (film thickness information). Further, if the characteristics of each of the plurality of units (the coating unit, the heat treatment unit, etc.) related to film formation included in the coating/developing apparatus 2 can be grasped to some extent, it may be possible to adopt a configuration in which the film thickness value is obtained based on which unit is used for the processing. Further, if it is known in advance from the apparatus characteristics that the film thickness after film formation is gradually changed, a value obtained by adding a predicted value of a time-dependent change to a periodically measured measurement value may be used as the film thickness value. The film thickness value used as the film thickness information may be a value with significantly high reliability and may be a value acquired (or calculated) without using the film thickness estimation model. The film thickness value can be acquired by using various methods. As an example, a film thickness value estimated by a method different from the film thickness estimation model may be used.

The film thickness value acquired by the shape characteristic value information acquisition part 107 may be acquired while performing a process related to film formation on the workpiece W as in the case of actual measurement performed by any method or may be acquired (calculated) in advance when a predicted value or the like is used as the film thickness value. Further, one film thickness value may be set for each workpiece W. For example, a plurality of film thickness values (e.g., for each shot or die) may be defined for one workpiece W.

The shape characteristic value information holding part 108 has a function of holding information on the film thickness of the target film (also referred to as a film thickness value: film thickness information), which corresponds to the shape characteristic value related to the target film acquired without using the film thickness estimation model. The shape characteristic value acquired without using the film thickness estimation model is the information acquired by the shape characteristic value information acquisition part 107. The shape characteristic value acquired without using the film thickness estimation model is used in the correlation estimation model creation part 112 to create a correlation estimation model while being held by the shape characteristic value information holding part 108.

Figure 6:
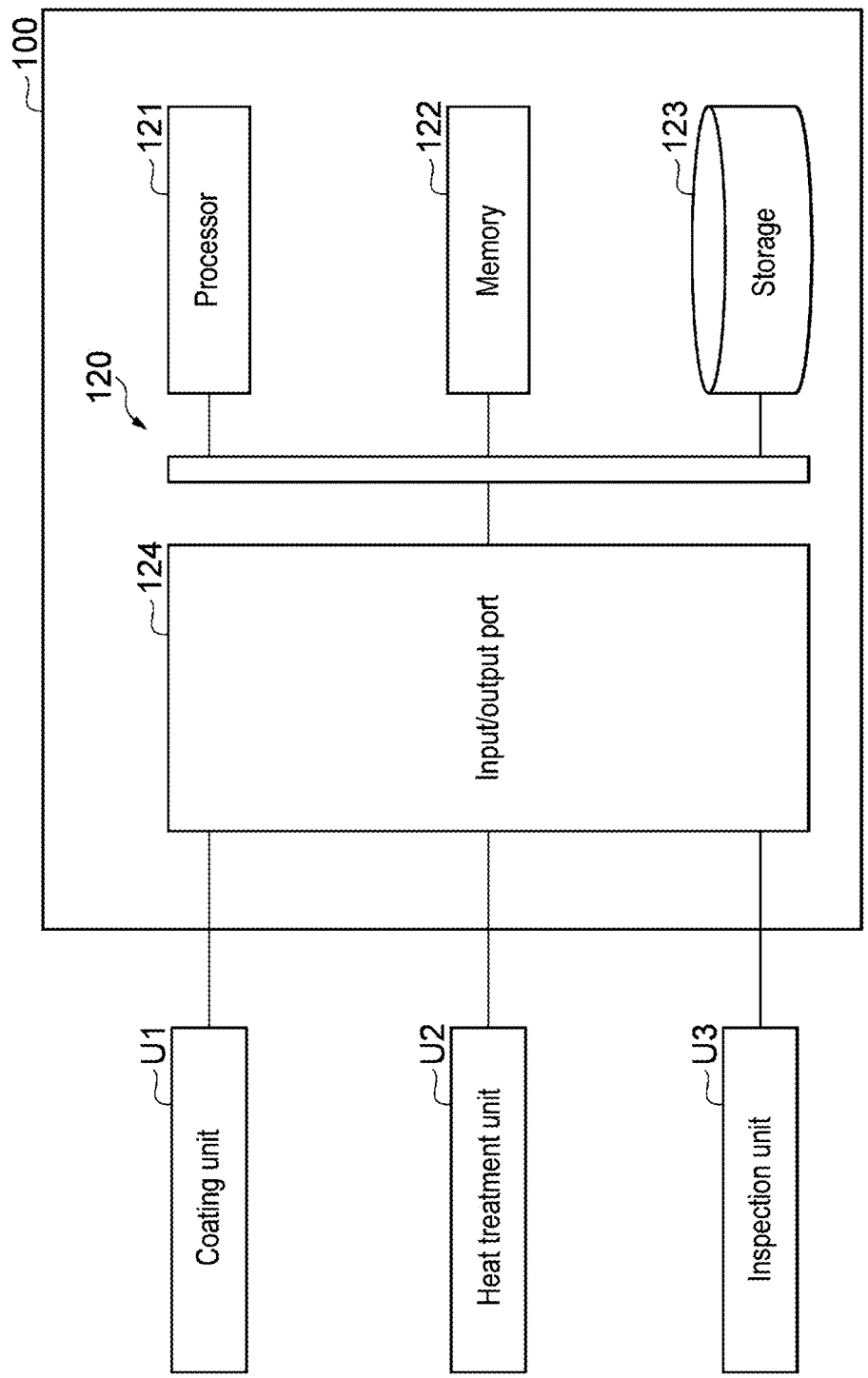
FIG. 6 is a block diagram showing an example of a hardware configuration of the control device.

The control device 100 is composed of one or more control computers. For example, the control device 100 includes a circuit 120 shown in FIG. 6. The circuit 120 includes one or more processors 121, a memory 122, a storage 123, and an input/output port 124. The storage 123 includes a non-transitory computer-readable storage medium such as a hard disk or the like. The storage medium stores a program for causing the control device 100 to execute the substrate inspection procedure described later. The storage medium may be a removable medium such as a non-volatile semiconductor memory, a magnetic disk, an optical disk, or the like. The memory 122 temporarily stores a program loaded from the storage medium of the storage 123 and a calculation result obtained by the processor 121. The processor 121 constitutes each of the above-described functional modules by executing the above program in cooperation with the memory 122. The input/output port 124 inputs and outputs an electric signal to and from a control target member according to a command from the processor 121.

The hardware configuration of the control device 100 is not necessarily limited to the one in which each functional module is configured by a program. For example, each functional module of the control device 100 may be composed of a dedicated logic circuit or an ASIC (Application Specific Integrated Circuit) in which the logic circuit is integrated.

In the following embodiment, a case in which the above-described configurations are included in the control device 100 will be described. However, the control device 100 may not include all the functions described above. For example, it may be possible to adopt a configuration in which functional units as databases, such as the image information holding part 103, the estimation model holding part 105 and the shape characteristic value information holding part 108 are provided in an external device.

Process Processing Procedure

Next, a process processing procedure executed in the coating/developing apparatus 2 will be described as an example of a coating/developing process.

In the process processing procedure, first, the control device 100 controls the transfer device A1 so as to transfer the processing target workpiece W in the carrier C to the shelf unit U10, and controls the transfer device A7 so as to arrange the workpiece W in the cell for the processing module 11.

Subsequently, the control device 100 controls the transfer device A3 so as to transfer the workpiece W of the shelf unit U10 to the coating unit U1 and the heat treatment unit U2 in the processing module 11. Further, the control device 100 controls the coating unit U1 and the heat treatment unit U2 so as to form an underlayer film on the surface of the workpiece W.

Thereafter, the control device 100 controls the transfer device A3 so as to return the workpiece W, on which the underlayer film is formed, to the shelf unit U10, and controls the transfer device A7 so as to arrange the workpiece W in the cell for the processing module 12.

Subsequently, the control device 100 controls the transfer device A3 so as to transfer the workpiece W in the shelf unit U10 to the coating unit U1 and the heat treatment unit U2 in the processing module 12. Further, the control device 100 controls the coating unit U1 and the heat treatment unit U2 so as to form an intermediate film on the underlayer film of the workpiece W. For example, the control device 100 controls the coating unit U1 so as to form an intermediate film by coating a processing liquid for formation of an intermediate film on the underlayer film of the workpiece W. Subsequently, the control device 100 controls the heat treatment unit U2 so as to perform a heat treatment on the intermediate film. After forming the intermediate film, the control device 100 controls the transfer device A3 so as to transfer the workpiece W to the inspection unit U3, and controls the inspection unit U3 to obtain image information (base image) by capturing the surface of the workpiece W. Thereafter, the control device 100 controls the transfer device A3 so as to return the workpiece W to the shelf unit U10, and controls the transfer device A7 so as to arrange the workpiece W in the cell for the processing module 13.

Subsequently, the control device 100 controls the transfer device A3 so as to transfer the workpiece W in the shelf unit U10 to each unit in the processing module 13, and controls the coating unit U1 and the heat treatment unit U2 so as to form a resist film on the intermediate film of the workpiece W. For example, the control device 100 controls the coating unit U1 so as to form a resist film by coating a processing liquid for formation of a resist film on the intermediate film of the workpiece W. Subsequently, the control device 100 controls the heat treatment unit U2 so as to heat-treat the resist film. After forming the resist film, the control device 100 controls the transfer device A3 so as to transfer the workpiece W to the inspection unit U3, and controls the inspection unit U3 to acquire image information (post-processing image) by capturing the surface of the workpiece W. Thereafter, the control device 100 controls the transfer device A3 so as to transfer the workpiece W to the shelf unit U11.

Subsequently, the control device 100 controls the transfer device A8 so as to send the workpiece W in the shelf unit U11 to the exposure apparatus 3. Thereafter, the control device 100 controls the transfer device A8 so as to receive the exposed workpiece W from the exposure apparatus 3 and arrange the workpiece W in the cell for the processing module 14 in the shelf unit U11.

Subsequently, the control device 100 controls the transfer device A3 so as to transfer the workpiece W of the shelf unit U11 to each unit in the processing module 14, and controls the coating unit U1 and the heat treatment unit U2 so as to develop the resist film R of the workpiece W. Thereafter, the control device 100 controls the transfer device A3 so as to return the workpiece W to the shelf unit U10, and controls the transfer device A7 and the transfer device A1 so as to return the workpiece W to the carrier C. Thus, the process processing is completed.

Film Thickness Estimation Method

Next, a film thickness estimation method performed in the processing modules 11 to 13 by the control device 100 will be described with reference to FIGS. 7 to 11. The film thickness estimation method is a method related to the inspection of the film-formed workpiece W, which is performed by the inspection unit U3 provided in the processing modules 11 to 13. In the inspection unit U3, it is evaluated, by estimating the film thickness, whether the desired film formation is performed on the film-formed workpiece W, particularly whether the film having a desired film thickness is formed.

In the following embodiment, a case of estimating the film thickness of a resist film will be described. Thus, the description will be made under the assumption that the target film is a resist film and the workpiece W on which the resist film is not formed (i.e., the workpiece on which the intermediate film is formed) is a base substrate (pre-processing substrate). However, the target film is not limited to the resist film. For example, the film thickness of the intermediate film may be estimated by using the intermediate film as the target film. In that case, the base substrate is a workpiece on which the intermediate film is not formed, i.e., a workpiece on which the base film is formed. In this way, the setting of the base substrate can be changed according to the target film to be subjected to film thickness estimation. Further, the base substrate may be a substrate on which the processing (e.g., film formation, etching, cleaning, etc.) has been performed by another apparatus. As described above, the base substrate is not particularly limited as long it is a substrate on which the target film is not formed.

When estimating the film thickness of the film formed on the workpiece, it is first necessary to prepare a film thickness estimation model to be used. That is, the film thickness estimation method described in the present embodiment includes a method of generating a film thickness estimation model. The film thickness estimation model used in the film thickness estimation method described in the present embodiment is different from the one whose creation method is generally known. Therefore, a method of creating a film thickness estimation model will be first described.

(Method of Creating Film Thickness Estimation Model)

FIGS. 7 to 10 show a procedure for creating a film thickness estimation model for estimating the film thickness.

Figure 7:
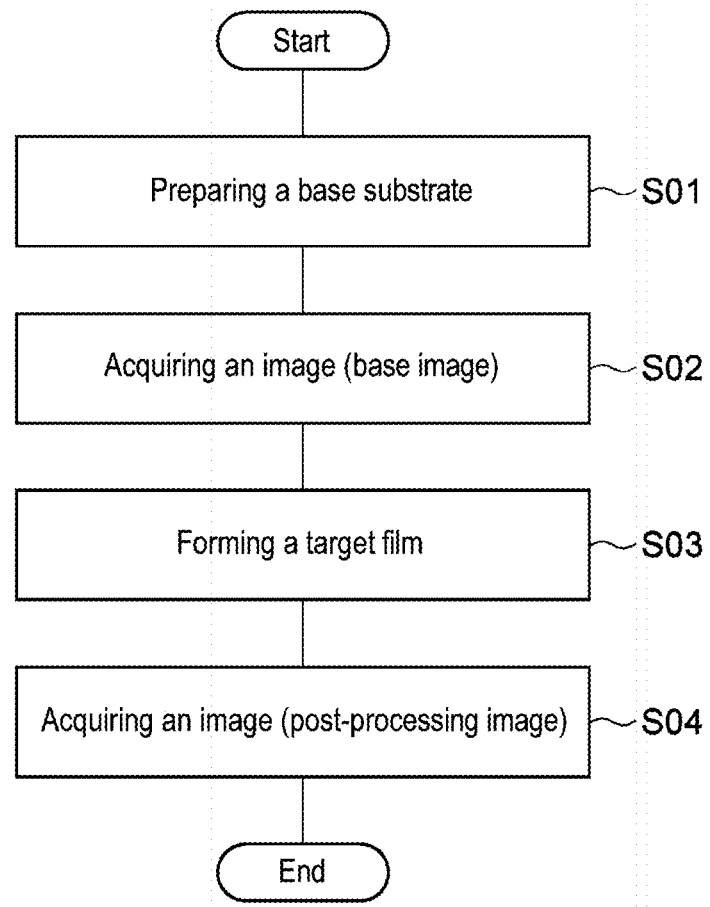
FIG. 7 is a flowchart showing an example of a method of creating a film thickness estimation model.

FIG. 7 shows a procedure for acquiring image information necessary for creating a film thickness estimation model. First, the control device 100 executes step S01. In step S01, a base substrate is prepared and loaded into the inspection unit U3. The base substrate is a workpiece W in which a film is formed up to an intermediate film in the coating unit U1 and the heat treatment unit U2 as described above. The loaded base substrate is held by the holder 31.

Subsequently, the base image acquisition part 101 of the control device 100 executes step S02. In step S02, the surface of the base substrate is captured by the capturing part 33. Specifically, the surface of the base substrate is captured by the capturing part 33 while moving the holder 31 in a predetermined direction by driving the linear driver 32. As a result, the capturing part 33 acquires image information (base image) on the surface of the base substrate. The base image is held by the image information holding part 103 of the control device 100.

Subsequently, the control device 100 executes step S03. In step S03, a resist film, which is a target film, is formed on the base substrate. The workpiece W on which the film is formed in the coating unit U1 and the heat treatment unit U2 is loaded into the inspection unit U3. The loaded workpiece W subjected to film formation is held by the holder 31.

Subsequently, the post-processing-image acquisition part 102 of the control device 100 executes step S04. In step S04, the surface of the processed workpiece W is captured by the capturing part 33 in the same manner as in step S02. Specifically, the surface of the workpiece W is captured by the capturing part 33 while moving the holder 31 in a predetermined direction by driving the linear driver 32. As a result, the image information (post-processing image) on the surface of the workpiece W is acquired by the capturing part 33. The post-processing image is held by the image information holding part 103 of the control device 100.

Subsequently, a film thickness estimation model is created by the procedure shown in FIG. 8. The film thickness estimation model M includes a gray value estimation model M1 created by the gray value estimation model creation part 111 and a correlation estimation model M2 created by the correlation estimation model creation part 112. In the procedure shown in FIG. 8, description will be made on a method of first creating the gray value estimation model M1 and then creating the correlation estimation model M2 indicating the correlation of a difference between a gray value estimated using the gray value estimation model M1 and an actual measurement value with information on the film thickness of a target film (film thickness information).

Figure 8:
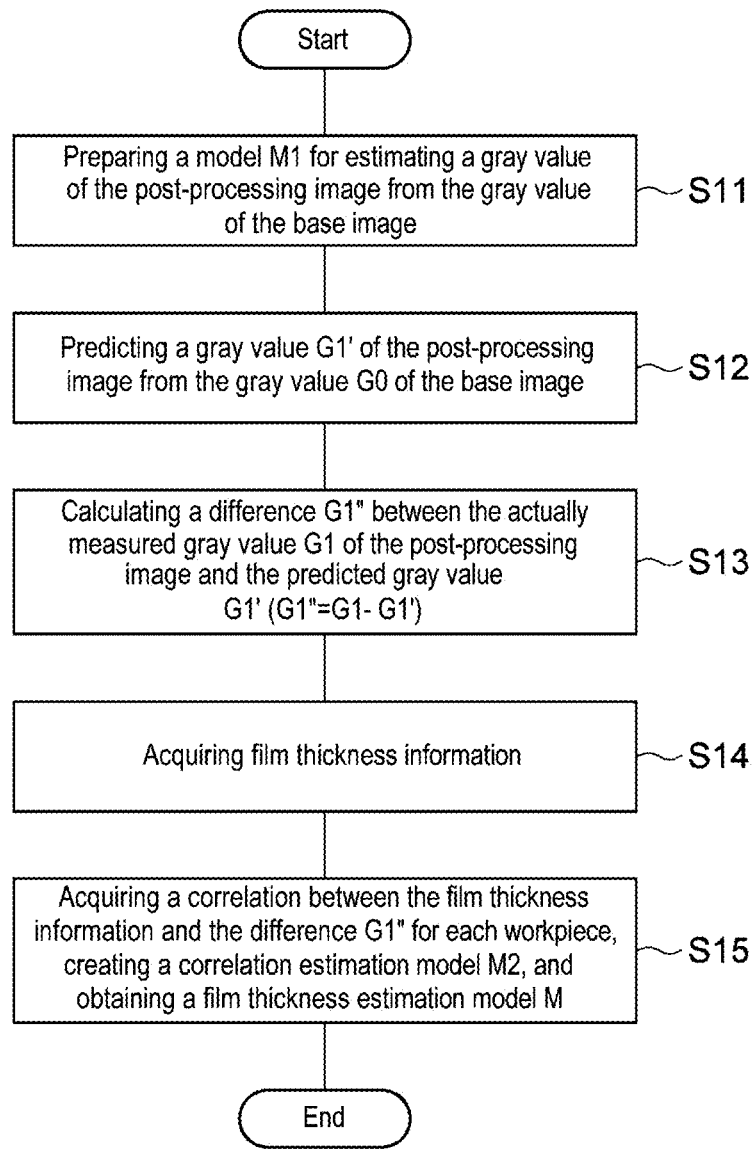
FIG. 8 is a flowchart showing an example of a method of creating a film thickness estimation model.

As shown in FIG. 8, the gray value estimation model creation part 111 of the control device 100 executes step S11. In step S11, the gray value estimation model M1 is created. The gray value estimation model M1 is a model that, when a target film having a predetermined film thickness is formed on the workpiece W, estimates a gray value of the image information (post-processing image) on the surface of the workpiece W subjected to target film formation, based on the gray value of the image information (base image) on the surface of the base substrate. In the coating/developing apparatus 2, a large number of base images of the workpiece W not subjected to target film formation and a large number of post-processing images of the workpiece subjected to target film formation are acquired for each workpiece W. Further, in the image obtained by capturing the workpiece W, information indicating the color of the workpiece W (luminance value, i.e., gray value) is calculated for each pixel. The gray value estimation model creation part 111 specifies the correlation of the gray value for each pixel of the base image and the post-processing image obtained by capturing the workpiece W. This makes it possible to create a model capable of estimating the gray value of the post-processing image based on the gray value of the image related to the surface of the base substrate.

Subsequently, the gray value estimation model creation part 111 of the control device 100 executes step S12. In step S12, a post-processing gray value G1' is predicted by applying the gray value estimation model M1 created in step S11 to the acquired base image of the workpiece W.

Subsequently, the correlation estimation model creation part 112 of the control device 100 executes step S13. In step S13, a difference G1" between the post-processing gray value G1' estimated in step S12 and the gray value G1 (actual measurement value) of the post-processing image corresponding to the base image is calculated. Step S13 may be performed by the gray value estimation model creation part 111. In the present embodiment, description will be made on a case in which the gray value estimation model creation part 111 performs the processing up to the creation of the gray value estimation model M1, and the correlation estimation model creation part 112 performs calculation using the created gray value estimation model M1.

Figure 9:
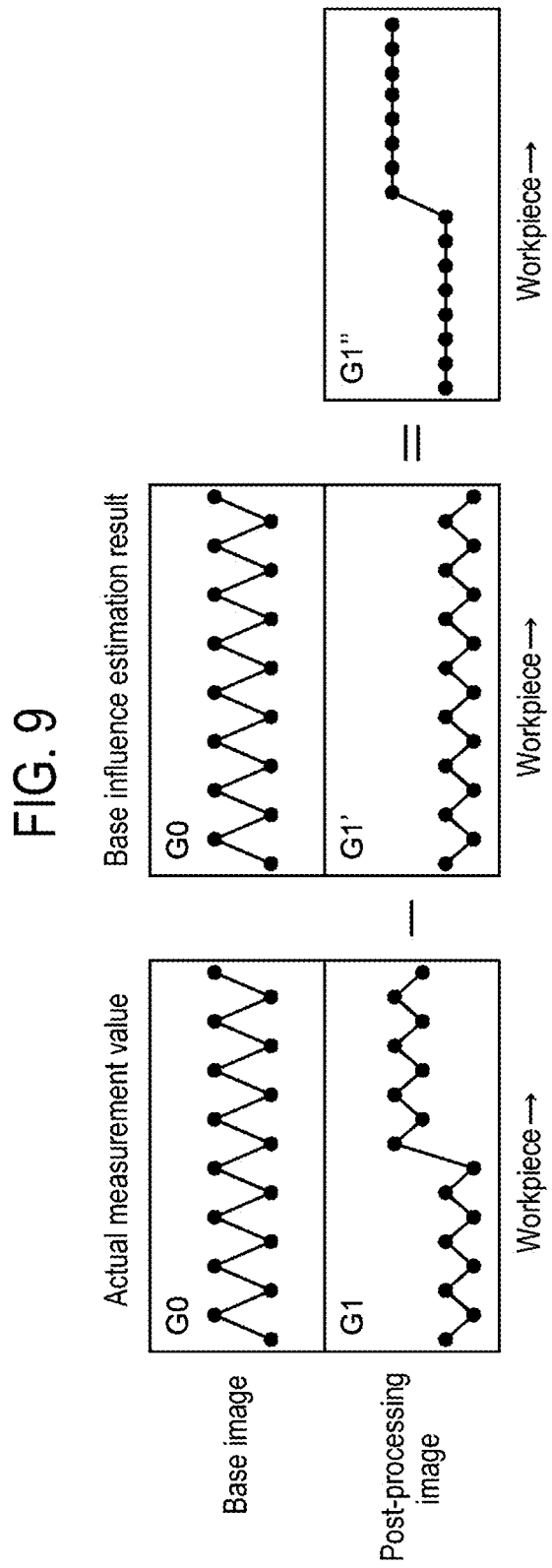
FIG. 9 is a schematic diagram illustrating an example of the content estimated by the film thickness estimation model.

The processes performed in steps S11 to S13 will be described with reference to FIG. 9. In FIG. 9, the variations of the gray value G0 of the base image and the gray value G1 of the post-processing image when sequentially capturing a plurality of workpieces W are indicated on the leftmost side. The horizontal axis in each figure indicates the workpiece W. For example, in the figure corresponding to the "actual measurement value-base image" on the upper left, it is shown that the gray value G0 of the base image fluctuates depending on the workpiece W. Further, in the figure corresponding to "actual measurement value-post-processing image" on the upper left, it is shown that the gray value G1 of the post-processing image fluctuates depending on the workpiece W.

The gray value estimation model M1 is a model that estimates G1 from the gray value G0 of the base image. That is, the model that estimates the gray value G1', which is shown in the graph below the gray value G0, based on the gray value G0 in the upper center graph shown in FIG. 9 is the gray value estimation model. When the gray value estimation model M1 is created using a large number of the base images and the post-processing images of the workpiece W, it is possible to create a model that reflects the change in the gray value of the post-processing image due to the variation in the gray value G0 of the base image of the workpiece W. When target films having different film thicknesses are formed on the workpieces W having the same gray value G0 of the base image, the change in the gray value due to the variation in the film thickness can be confirmed in the post-processing image. However, in the model that estimates the gray value of the post-processing image, which is created from the base images having a wide variety of gray values, the variation in the gray value in the base image greatly contribute to the variation in the gray value of the post-processing image. That is, even if the film thicknesses of the target films formed on the plurality of workpieces W are slightly different, it is possible to create an estimation model that reflects a component derived from the variation in the gray value G0 of the base image of the workpiece W.

However, it is considered that the gray value G1' of the post-processing image estimated by the gray value estimation model M1 does not match the gray value G1 of the post-processing image obtained by actually capturing the workpiece W. This is because the gray value estimation model M1 is a model for estimating the component derived from the variation in the gray value G0 of the base image of the workpiece W, and the component derived from the variation in the film thickness is not estimated. Therefore, the variation in the difference G1 "between the gray value G1 of the post-processing image obtained by actually capturing the workpiece W and the gray value G1' of the post-processing image estimated by the gray value estimation model M1 is derived due to the variation in the film thickness of the film formed on the workpiece W. In FIG. 9, the result of calculating a difference G1", which is a difference between the gray value G1 of the post-processing image obtained by actually capturing each of the plurality of workpieces W and the gray value G1' of the post-processing image estimated by the gray value estimation model M1, is indicated on the lower right side. By performing such a calculation, the component derived from the variation in the gray value G0 of the base image obtained by actually capturing the workpiece W is eliminated. As a result, a numerical value greatly affected by the variation in the gray value derived from the film thickness of the target film can be obtained as the difference G1 of the gray values.

Figure 10:
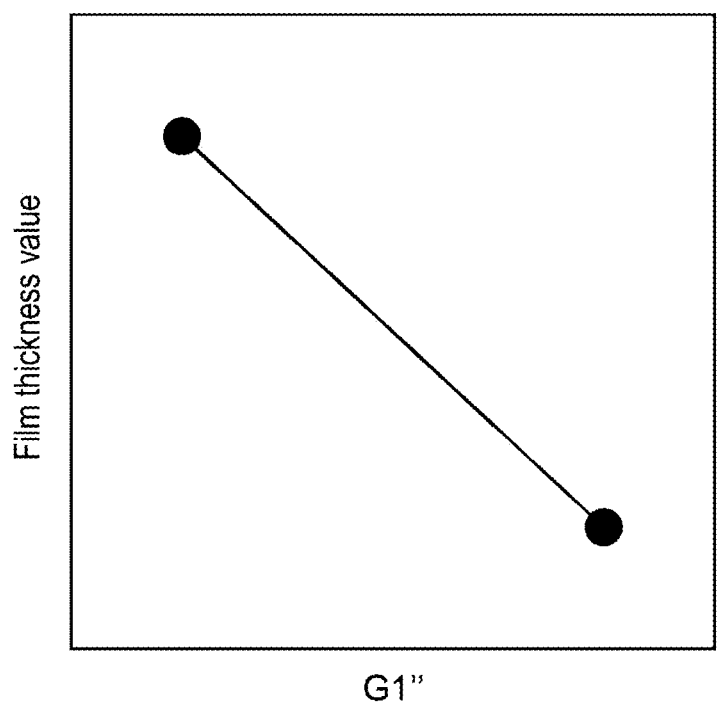
FIG. 10 is a schematic diagram illustrating an example of the correlation indicated by a correlation estimation model.

In this regard, if the correlation between the difference G1" of the gray values of the respective workpieces W and the film thickness formed on the workpiece W is known, the film thickness can be estimated from the difference G1" of the gray values. That is, as shown in FIG. 10, if the information indicating the correlation between the difference G1" of the gray values and the film thickness can be obtained, the film thickness of the target film can be estimated from the difference G1" of the gray values by using this correlation.

The information specifying the film thickness of the target film is not used in the creation of the gray value estimation model M1 in steps S11 to S13, which are the steps described so far, and the calculation using the gray value estimation model M1. However, the information on the film thickness related to each workpiece W is required to grasp the correlation shown in FIG. 10. Therefore, a model for acquiring the film thickness information obtained without using the above-described model and estimating the correlation between the gray value G1" and the film thickness is created.

Returning to FIG. 8, the correlation estimation model creation part 112 of the control device 100 executes step S14. In step S14, as described above, the film thickness information necessary for creating the model for estimating the correlation between the gray value difference G1" and the film thickness is acquired. The film thickness information is acquired by the shape characteristic value information acquisition part 107 of the control device 100. At this time, the film thickness information includes information specifying the workpiece W and information specifying the film thickness related to the workpiece W. In step S14, the correlation estimation model creation part 112 acquires the film thickness information corresponding to the workpiece W for which the difference G1" is calculated.

Subsequently, the correlation estimation model creation part 112 of the control device 100 executes step S15. In step S15, a correlation estimation model M2 is created based on the difference G1" of the gray values calculated so far and the film thickness information. Since the gray value estimation model M1 and the correlation estimation model M2 are created in the above-described process, the film thickness estimation model M is created. The created film thickness estimation model M is held by the estimation model holding part 105.

It is not necessary to perform the series of processes shown in FIG. 8 at one time. For example, the processes up to the creation of the gray value estimation model M1 (e.g., steps S11 and S12) may be performed in advance. Moreover, for example, at a timing when the film thickness information can be acquired, the subsequent process related to the creation of the correlation estimation model (e.g., steps S13 to S15) may be performed. Further, upon acquisition of the film thickness information (step S14), the calculation of the difference G1" (step S13) and the creation of the correlation estimation model M2 (step S15) may be performed. In this way, the processing flow shown in FIG. 8 may be partially changed.

The film thickness information may be acquired at the timing described below. For example, when at least a portion of the conditions for forming the target film is changed, there may be a case in which the processing is performed using an inspection substrate or the like for the purpose of confirming the operation. Specifically, there may be a case in which the conditions related to the formation of the target film are changed during maintenance of the coating/developing apparatus 2, a case in which an evaluation using an inspection substrate is performed for adjusting the conditions when the processing liquid for forming the target film is replaced, or the like. In such a case, a process of evaluating the film thickness of the target film after actually forming the target film on the workpiece W may be generated for the purpose of confirming the manufacturing conditions and the like. At this time, the correlation estimation model creation part 112 of the control device 100 may be configured to create the correlation estimation model M2 using the film thickness information.

The correlation estimation model M2 is a model that can created by acquiring the film thickness information as described above, whereas the gray value estimation model M1 is a model that can be created if there are the base image and the post-processing image as described above. Therefore, the gray value estimation model M1 may be created at an appropriate timing by using the image of the workpiece W held by the estimation model creation device.

(Film Thickness Estimation Method Based on Film Thickness Estimation Model)

A method of estimating the film thickness of the target workpiece W will be described with reference to FIG. 11. First, the control device 100 executes step S21. In step S21, the workpiece W serving as a base substrate (pre-processing substrate) is prepared and loaded into the inspection unit U3. The loaded base substrate is held by the holder 31.

Subsequently, the base image acquisition part 101 of the control device 100 executes step S22. In step S22, the surface of the base substrate is captured by the capturing part 33. Specifically, the surface of the base substrate is captured by the capturing part 33 while moving the holder 31 in a predetermined direction by driving the linear driver 32. As a result, the capturing part 33 acquires image information (base image) on the surface of the base substrate. The base image is held by the image information holding part 103 of the control device 100.

Subsequently, the control device 100 executes step S23. In step S23, a resist film, which is a target film, is formed on the base substrate. The workpiece W on which the film is formed in the coating unit U1 and the heat treatment unit U2 is loaded into the inspection unit U3. The loaded workpiece W after the film formation is held by the holder 31.

Subsequently, the post-processing-image acquisition part 102 of the control device 100 executes step S24. In step S24, the surface of the processed workpiece W is captured by the capturing part 33 in the same manner as in step S22. Specifically, the surface of the workpiece W is captured by the capturing part 33 while moving the holder 31 in a predetermined direction by driving the linear driver 32. As a result, the capturing part 33 acquires image information (post-processing image) on the surface of the workpiece W. The post-processing image is held by the image information holding part 103 of the control device 100.

Subsequently, the estimation part 106 of the control device 100 executes step S25. In step S25, the film thickness of the target film on the surface of the workpiece W is estimated based on the post-processing image of the surface of the workpiece W. The film thickness estimation model held by the estimation model holding part 105 is used for estimating the film thickness by the estimation part 106.

Specifically, the method of estimating the film thickness from the post-processing image is as follows. First, information on the color of the surface of the workpiece W for each pixel is acquired from the base image. Assuming that the gray value of the obtained base image is G0, the gray value estimation model M1 of the film thickness estimation model M is used to estimate the gray value G1' of the post-processing image. Subsequently, the difference G1" between the gray value G1' obtained by using the gray value estimation model M1 and the actual gray value G0 in the post-processing image is calculated. By applying the correlation estimation model M2 to the calculated difference G1", the film thickness value estimated from the difference G1" is calculated. By this series of operations, the film thickness of the region in which each pixel is captured can be estimated. This makes it possible to estimate the thickness of the target film for each pixel, i.e., at each position on the surface of the workpiece W.

OTHER EMBODIMENTS

Various omissions, substitutions and modifications may be made without being limited to the exemplary embodiment described above. In addition, elements in different embodiments may be combined with each other to form other embodiments.

For example, in the above embodiment, there has been described the case in which the shape characteristic value of the target film is "film thickness". However, the shape characteristic value is not limited to the film thickness. For example, as described above, the "line width" of the target film may be used as the estimation target. Just like the film thickness, the color of the surface of the workpiece W may be changed when the line width of the target film is changed. Therefore, it is possible to create an estimation model capable of accurately estimating the line width by the same method as the method described in the above embodiment. Specifically, a gray value estimation model (color-change estimation model) is created from the base image and the post-processing image. Subsequently, a gray value G1' after processing is predicted by applying the gray value estimation model to the acquired base image of the workpiece W. Thereafter, a difference G1" between the gray value G1' as the estimation result and the gray value G1 (actual measurement value) of the post-processing image corresponding to the base image is calculated, and a correlation estimation model indicating the correlation between the difference G1" and the line width is created. In this way, it is possible to create a model for estimating the line width by the same method as the model for estimating the film thickness. The method described in the present embodiment can be applied to a shape characteristic value having a correlation with the color of the surface of the workpiece W.

Further, in the above embodiment, there has been described the case in which the film thickness estimation model is created in the control device 100 and the film thickness is estimated using the model. However, it may be implemented as a computer having only a function as an estimation model creation device for creating a film thickness estimation model. Specifically, the estimation model creation device may be a device having only a function as the base image acquisition part 101, the post-processing-image acquisition part 102 or the model creation part 104. In this case, the estimation model creation device may be implemented as an information processing device independent of the coating/developing apparatus 2. When the estimation model creation device is an information processing device independent of the coating/developing apparatus 2, the base image acquisition part 101 and the post-processing-image acquisition part 102 may have a function of acquiring a base image and a post-processing image captured by a device different from the estimation model creation device.

Further, the control device 100 may not create the gray value estimation model M1 and the correlation estimation model M2 constituting the film thickness estimation model in the estimation model creation device. Alternatively, the control device 100 may have a function of acquiring a gray value estimation model M1 and a correlation estimation model M2 created for another device of the same type and modifying them. For example, the coating/developing apparatus 2 may be provided with a plurality of modules of the same type and may be provided with a plurality of modules for forming a resist film as a target film. In such a case, basically the same type of model can be applied to the same type of device. However, a slight difference in characteristics between the devices may appear in the film thickness estimation model M. In such a case, the film thickness estimation model M created for another device (module) of the same type may be acquired, the film thickness estimation may be performed for a certain period of time using the model, and then modification may be performed. As an example of the modification, it is conceivable that an offset value corresponding to the difference in the characteristics between the devices is calculated by using the measurement result of the film thickness obtained by using an inspection workpiece W at a certain timing, and the model is modified by using this offset value. In this way, the model of the estimation model creation device may be created by using the model created in another device and further modifying the model.

In the above embodiment, the gray value estimation model M1 and the correlation estimation model M2 constituting the film thickness estimation model M have been described principally based on the case in which the gray value or the correlation is estimated on a pixel-by-pixel basis. However, the present disclosure is not limited to this configuration. That is, it may be possible to adopt a configuration in which the film thickness of the region is estimated from the average value of the pixel values of a plurality of pixels in which the workpiece W is captured. It may also be possible to adopt a configuration in which an average value is calculated on a workpiece-by-workpiece basis and the film thickness of the target film formed on the workpiece W is estimated.

For example, in the above embodiment, there has been described the case in which the inspection unit U3 is provided in each of the processing modules 11, 12 and 13. However, the inspection unit U3 may not be provided in each module but may be provided independently of each module.

The film formed by the processing modules 11, 12 and 13 described above is nothing more than an example and may be appropriately changed. For example, a film may be formed on the resist film. That is, the film inspection method described in this embodiment is not limited to the type and number of films described above and may be applied to various films formed on substrates.

Operation

According to the estimation model creation device (control device 100) and the estimation model creation method described above, the color-change estimation model (gray value estimation model M1) for estimating the information on the color of the surface of the substrate included in the post-processing image from the information on the color of the surface of the substrate included in the base image as the pre-processing image is created. Then, the correlation estimation model M2 for obtaining the difference between the information on the color of the surface of the substrate included in the post-processing image and the result estimated by the color-change estimation model and estimating the correlation between the difference and the shape characteristic value of the target film subjected to the film processing is created. The color-change estimation model is a model that estimates the color of the surface of the substrate included in the post-processing image from the information on the color of the surface of the substrate included in the base image, and is a model that estimates a variation of the color of the surface of the substrate included in the post-processing image due to the variation of the color of the surface of the substrate included in the base image (pre-processing image). Meanwhile, the difference between the information on the color of the surface of the substrate included in the post-processing image and the result estimated by the color-change estimation model is a factor that may vary depending on the shape of the target film. Therefore, by creating the correlation estimation model that estimates the correlation between the difference and the shape characteristic value of the target film subjected to the film processing, the shape characteristic value of the target film can be estimated from the difference. By creating such a model, it is possible to more easily create a model capable of accurately estimating the shape characteristic value related to the target film.

Generally, when trying to obtain the shape characteristic value of the target film formed on the substrate from the image information obtained by capturing the substrate, it is necessary to perform a process of preparing a large number of substrates on which target films are formed under various conditions and creating a calibration curve from the image information for these substrates. However, in order to create an accurate calibration curve, a large number of substrates to be used for creating the calibration curve needs to be prepared. It is conceivable that an accurate calibration curve cannot be created depending on the working environment. Particularly, since the process in the previous stage is complicated, it is conceivable that the variation of the color of the pre-processed substrate due to the process in the previous stage may affect the accuracy of creating the calibration curve. On the other hand, according to the above-described method, by adopting the configuration in which the color-change estimation model for estimating the influence of the color of the unprocessed substrate is created and the information on the color in the post-processing image is first obtained from the information on the color in the pre-processing image, the variation derived from the color in the unprocessed substrate is specified first. Then, the factor that can vary depending on the shape of the target film appears as a difference between the information on the color of the surface of the substrate included in the post-processing image and the result estimated by the color-change estimation model. Therefore, by creating the correlation estimation model that estimates the correlation between this difference and the shape characteristic value of the target film formed on the substrate, the shape characteristic value can be estimated in a state in which the variation component derived from the color of the unprocessed substrate is eliminated. Therefore, it is possible to create a model that estimates the shape characteristic value with high accuracy without preparing a substrate or the like for creating a calibration curve.

Further, the correlation estimation model creation part 112 creates a correlation estimation model by using the shape characteristic value of the target film acquired without using the estimation model as the shape characteristic value of the target film subjected to film processing. Therefore, the correlation estimation model can be created by using the shape characteristic value obtained independently of the shape characteristic value estimation model. Accordingly, it is possible to accurately estimate the shape characteristic value related to the shape of the target film.

Further, by adopting the configuration in which the correlation estimation model creation part 112 creates the correlation estimation model upon acquiring the information specifying the shape characteristic value of the target film subjected to the film processing, for example, the color-change estimation model can be created by using a large number of images acquired in the past. If the creation of the color-change estimation model and the creation of the correlation estimation model can be performed independently in this way, the information suitable for the creation of each model can be effectively used, and the model capable of performing estimation with higher accuracy can be created.

One of the color-change estimation model creation part (the gray value estimation model creation part 111) and the correlation estimation model creation part 112 may be configured to create a model for the estimation model creation device by modifying a model created by a device different from the estimation model creation device. In this case, for example, since the shape characteristic value estimation model can be created by using the model created by another device, the model once created can be expanded to other devices and can be effectively used.

In the embodiment of the present disclosure, the film-forming process performed by coating the processing liquid has been described as the film processing on the substrate. However, the film processing on the substrate is not limited thereto. For example, the configuration described in the above embodiment can be applied to an etching process for removing a film formed on a substrate by supplying a processing liquid. That is, the "film processing" includes various types of processing that can change the shape of the target film formed on the substrate.

When the "film processing" is an etching process, for example, the amount of etching (thickness of the film removed by etching: film loss) is assumed to be a shape characteristic value to be estimated. In addition, at the time of detailed inspection (QC inspection) related to the operation check of the above-described apparatus, an inspection substrate on which a film is formed in advance may be etched and evaluated, and the inspection result obtained at this time may be used as an etching value (etching information). For example, if the film thickness value before etching is known, the etching value can be obtained by measuring the film thickness after etching and then obtaining a subtraction value (film loss amount) of the film thickness value before etching and the film thickness after etching. When the "film processing" is changed in this way, the shape characteristic value may also be changed depending on the content of the film processing. Even in that case, the shape characteristic value can be estimated by utilizing the change in the color of the surface of the substrate before and after the film processing. Further, based on the configuration described in the above embodiment, it is possible to more easily create a model capable of accurately estimating the shape characteristic value.

According to the present disclosure in some embodiments, it is possible to provide a technique capable of easily creating a model for estimating a characteristic value related to the shape of a substrate.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An estimation device, comprising:
a first memory that stores a color-change estimation model created based on first information on a color of a surface of a substrate included in a post-processing image, which is first image information on the surface of the substrate subjected to film processing, and based on second information on the color of the surface of the substrate included in a pre-processing image, which is second image information on the surface of the substrate not subjected to the film processing; and
a color estimation circuit configured to estimate the first information on the color of the surface of the substrate included in the post-processing image based on the color-change estimation model and the second information on the color of the surface of the substrate included in the pre-processing image.

2. The estimation device of claim 1, further comprising:
a second memory that stores a correlation estimation model created based on a difference between the first information on the color of the surface of the substrate included in the post-processing image and a result estimated by the color estimation circuit; and
a correlation estimation circuit configured to estimate a correlation between the difference and a shape characteristic value of a target film on the substrate subjected to the film processing, based on the correlation estimation model.

3. The estimation device of claim 1, wherein the color estimation circuit is configured to estimate the first information which corresponds to a pixel at each position on the substrate.

4. The estimation device of claim 1, wherein the correlation estimation model is created by using a shape characteristic value of a target film on the substrate subjected to the film processing, which is acquired without using a shape characteristic value estimation model.

5. The estimation device of claim 1, wherein the correlation estimation model is created by acquiring information specifying a shape characteristic value of a target film on the substrate subjected to the film processing.

6. The estimation device of claim 1, wherein the color-change estimation model is created to be adapted for the estimation device by modifying a model created by a device different from the estimation device.

7. The estimation device of claim 1, wherein the correlation estimation model is created to be adapted for the estimation device by modifying a model created by a device different from the estimation device.

8. The estimation device of claim 1, wherein the film processing is film formation processing for forming a film on the substrate.

9. An estimation method used in an estimation device, the estimation method comprising:
storing, by a first memory of the estimation device, a color-change estimation model created based on first information on a color of a surface of a substrate included in a post-processing image, which is first image information on the surface of the substrate subjected to film processing, and based on second information on the color of the surface of the substrate included in a pre-processing image, which is second image information on the surface of the substrate not subjected to the film processing; and
estimating, by a color estimation circuit of the estimation device, the first information on the color of the surface of the substrate included in the post-processing image based on the color-change estimation model and the second information on the color of the surface of the substrate included in the pre-processing image.

10. The estimation method of claim 9, further comprising:
storing, by a second memory of the estimation device, a correlation estimation model created based on a difference between the first information on the color of the surface of the substrate included in the post-processing image and a result estimated by the color estimation circuit; and
estimating, by a correlation estimation circuit of the estimation device, a correlation between the difference and a shape characteristic value of a target film on the substrate subjected to the film processing, based on the correlation estimation model.

11. The estimation method of claim 9, wherein the color estimation circuit is configured to estimate the first information which corresponds to a pixel at each position on the substrate.

12. The estimation method of claim 9, wherein the correlation estimation model is created by using a shape characteristic value of a target film acquired without using a shape characteristic value estimation model as the shape characteristic value of the target film on the substrate subjected to the film processing.

13. The estimation method of claim 9, wherein the correlation estimation model is created by acquiring information specifying a shape characteristic value of a target film on the substrate subjected to the film processing.

14. The estimation method of claim 9, wherein the color-change estimation model is created to be adapted for the estimation device by modifying a model created by a device different from the estimation device.

15. The estimation method of claim 9, wherein the correlation estimation model is created to be adapted for the estimation device by modifying a model created by a device different from the estimation device.

16. The estimation method of claim 9, wherein the film processing is film formation processing for forming a film on the substrate.

17. A non-transitory computer-readable storage medium that stores a program for causing a device to perform the estimation method of claim 9.

* * * * *